United States Patent
Lorenz et al.

(10) Patent No.: US 9,774,458 B2
(45) Date of Patent: Sep. 26, 2017

(54) METHOD FOR TRANSPORTING ETHERNET AND NON-ETHERNET TRAFFIC OVER THE SAME MEDIUM

(71) Applicant: Alcatel-Lucent USA Inc., Murray Hill, NJ (US)

(72) Inventors: Diana L. Lorenz, Naperville, IL (US); Mark G. Bradac, Genoa, IL (US); Steven C. Martin, Naperville, IL (US); Greg Martin, Lisle, IL (US); Wayne R. Wilcox, Oswego, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 231 days.

(21) Appl. No.: 14/596,652

(22) Filed: Jan. 14, 2015

(65) Prior Publication Data
US 2016/0205589 A1   Jul. 14, 2016

(51) Int. Cl.
*H04L 12/43* (2006.01)
*H04L 12/00* (2006.01)
*H04L 12/413* (2006.01)

(52) U.S. Cl.
CPC ............ *H04L 12/00* (2013.01); *H04L 12/413* (2013.01)

(58) Field of Classification Search
CPC ....... H04L 12/00; H04L 12/43; H04L 12/413; H04J 3/1694; H04Q 11/0062; H04Q 11/0066; H04Q 11/0067; H04Q 2011/0064
USPC .................................. 370/432, 458, 465, 468
See application file for complete search history.

(56) References Cited

U.S. PATENT DOCUMENTS

| | | | | |
|---|---|---|---|---|
| 5,579,316 A * | 11/1996 | Venters | ................... | H04J 3/247 370/392 |
| 6,324,184 B1 * | 11/2001 | Hou | .................... | H04L 12/2801 370/468 |
| 6,879,573 B1 * | 4/2005 | Huo | .................... | H04B 7/2643 370/337 |
| 7,289,538 B1 * | 10/2007 | Paradise | ............... | H04J 3/0632 370/497 |
| 7,613,212 B1 * | 11/2009 | Raz | ....................... | H04J 3/0641 370/510 |
| 8,532,094 B2 * | 9/2013 | Fourcand | ........... | H04Q 11/0478 370/353 |
| 8,855,492 B2 * | 10/2014 | Hood | .................. | H04J 14/0234 398/66 |
| 2001/0014104 A1 * | 8/2001 | Bottorff | ................ | H04J 3/1617 370/471 |

(Continued)

FOREIGN PATENT DOCUMENTS

FR   WO 2013083222 A1 *   6/2013   ......... H04B 10/2575

*Primary Examiner* — Khaled Kassim
*Assistant Examiner* — Berhanu Belete
(74) *Attorney, Agent, or Firm* — Loza & Loza, LLP

(57) ABSTRACT

Network elements within a network are configured to transport Ethernet traffic and non-Ethernet traffic over a same medium. The network elements can generate and process multi-frames that include the Ethernet traffic and non-Ethernet traffic. Each of the plurality of group slots includes a first set of bytes allocated to carry the non-Ethernet traffic and a second set of bytes allocated to carry the Ethernet traffic. At least one group slot of the plurality of group slots includes a timestamp, and the network elements are further configured to use the timestamp to reconstruct the original spacing between packets of the Ethernet traffic.

16 Claims, 6 Drawing Sheets

(56) References Cited

U.S. PATENT DOCUMENTS

| | | | |
|---|---|---|---|
| 2003/0137975 A1* | 7/2003 | Song | H04J 3/0652 370/353 |
| 2003/0177243 A1* | 9/2003 | Collette | H04L 12/4633 709/227 |
| 2008/0049621 A1* | 2/2008 | McGuire | H04L 12/24 370/236.2 |
| 2009/0067850 A1* | 3/2009 | Mizutani | H04J 3/0605 398/154 |
| 2012/0008646 A1* | 1/2012 | Fourcand | H04J 3/0673 370/514 |
| 2012/0033971 A1* | 2/2012 | Fourcand | H04Q 11/0478 398/54 |
| 2012/0263099 A1* | 10/2012 | Lee | H04W 88/085 370/315 |
| 2013/0129347 A1* | 5/2013 | Shin | H04B 10/0775 398/25 |
| 2014/0355991 A1* | 12/2014 | Cameirao | H04B 10/2575 398/79 |
| 2015/0180575 A1* | 6/2015 | Bruckman | H04J 3/1652 398/115 |

* cited by examiner

METHOD FOR TRANSPORTING ETHERNET AND NON-ETHERNET TRAFFIC OVER THE SAME MEDIUM

BACKGROUND OF THE INVENTION

Technical Field of the Invention

This invention relates generally to communication networks and in particular to carrying Ethernet traffic and non-Ethernet traffic over the same medium.

Description of Related Art

The Common Public Radio Interface (CPRI) defines the protocol interface between the radio equipment control (REC) and the radio equipment (RE) in wireless basestations. Conventional basestations are located adjacent to the antenna, typically at the base of the antenna tower. However, finding suitable sites can be a challenge because of the footprint required for the equipment and the availability of power sources.

CPRI allows the use of a distributed architecture where basestations, containing the REC, are connected to remote radio heads via lossless fibre links that carry the CPRI data. This architecture reduces costs for service providers because only the remote radio heads containing the RE need to be situated in remote locations. The basestations can be centrally located in locations where footprint, climate, and availability of power are more easily managed.

Recently, a need has arisen to transmit Ethernet traffic over transport media used to carry CPRI traffic or other types of non-Ethernet traffic. However, Ethernet traffic requires constant bit-rate (CBR) channels with channel rates that can be configured between 30 MHz and 1 GHz. In addition, the original spacing between the packets needs to be maintained at the far end of the link.

SUMMARY

Embodiments of the present disclosure are directed to transporting Ethernet and non-Ethernet traffic over the same medium. A network element within a network includes an input port, a processor and an output port. The input port is configured to couple to a transport medium in the network to receive a multi-frame including Ethernet traffic and non-Ethernet traffic. The processor is configured to process the multi-frame to identify a plurality of group slots. Each of the plurality of group slots includes a first set of bytes allocated to carry the non-Ethernet traffic and a second set of bytes allocated to carry the Ethernet traffic. A group slot of the plurality of group slots includes a timestamp, and the processor is further configured to extract the Ethernet traffic from the plurality of group slots. The output port is configured to transmit the Ethernet traffic over an additional transport medium in the network. The processor further uses the timestamp to reconstruct the original spacing between packets of the Ethernet traffic prior to transmitting the Ethernet traffic over the additional transport medium.

In another embodiment, a network element within a network includes an input port, a processor and an output port. The input port is configured to couple to a transport medium in the network to receive Ethernet traffic. The processor is configured to generate a multi-frame including the Ethernet traffic and non-Ethernet traffic. The multi-frame includes a plurality of group slots, in which each of the plurality of group slots includes a first set of bytes allocated to carry the non-Ethernet traffic and a second set of bytes allocated to carry the Ethernet traffic. The processor further generates a timestamp and includes the timestamp in a group slot of the plurality of group slots. The timestamp is generated to enable an additional network element to reconstruct original spacing between packets of the Ethernet traffic. The output port is configured to transmit the multi-frame over an additional transport medium in the network.

In still another embodiment, a method for transporting traffic over a network includes receiving a multi-frame including Ethernet traffic and non-Ethernet traffic at a network element and processing, by a processor within the network element, the multi-frame to identify a plurality of group slots. Each of the plurality of group slots includes a first set of bytes allocated to carry the non-Ethernet traffic and a second set of bytes allocated to carry the Ethernet traffic. A group slot of the plurality of group slots includes a timestamp. The method further includes extracting, by the processor, the Ethernet traffic from the plurality of group slots and using, by the processor, the timestamp to reconstruct original spacing between packets of the Ethernet traffic. The method still further includes transmitting the Ethernet traffic by the network element over the network based on the original spacing.

In some embodiments of any of the above apparatus/methods, the second set of bytes in each of the plurality of group slots includes a same predetermined number of bytes.

In some embodiments of any of the above apparatus/methods, a last group slot in the plurality of group slots is empty.

In some embodiments of any of the above apparatus/methods, the first set of bytes includes the non-Ethernet traffic and padding prior to the start of the Ethernet traffic in the second set of bytes.

In some embodiments of any of the above apparatus/methods, the Ethernet traffic is received from two or more Ethernet links and the second set of bytes includes the Ethernet traffic from each of the two or more Ethernet links.

In some embodiments of any of the above apparatus/methods, each of the two or more Ethernet links is allocated a specific number of bytes in the second set of bytes of each of the plurality of group slots.

In some embodiments of any of the above apparatus/methods, the Ethernet traffic includes a plurality of Ethernet frames, each of the plurality of Ethernet frames is sent continuously in consecutive compressed Ethernet segments within the multi-frame, each of the compressed Ethernet segments includes the Ethernet traffic associated with a single Ethernet link and each of the group slots includes at least part of a compressed Ethernet segment.

In some embodiments of any of the above apparatus/methods, each of the compressed Ethernet segments includes a predetermined number of bytes spread out over two or more of the group slots.

In some embodiments of any of the above apparatus/methods, a first byte in each of the compressed Ethernet segments includes a header.

In some embodiments of any of the above apparatus/methods, the header includes a length field indicating a number of bytes of a first Ethernet frame within the compressed Ethernet segment, an end of frame bit indicating an end of frame for the first Ethernet frame and a start of frame bit indicating a start of frame for a second Ethernet frame within the compressed Ethernet segment.

In some embodiments of any of the above apparatus/methods, the end of frame bit is set to one when the Ethernet frame ends within the compressed Ethernet segment and the start of frame bit is set to one when the second Ethernet frame starts within the compressed Ethernet segment.

In some embodiments of any of the above apparatus/ methods, the part of the compressed Ethernet segment included within each of the group slots is equivalent to a number of bytes allocated to the Ethernet link associated with the compressed Ethernet segment for each of the group slots.

In some embodiments of any of the above apparatus/ methods, the Ethernet traffic includes a plurality of Ethernet frames and the timestamp indicates when an Ethernet frame was received by a sending network node relative to when a main frame including a plurality of multi-frames was transmitted by the sending network node to the network element.

In some embodiments of any of the above apparatus/ methods, the non-Ethernet traffic includes Common Public Radio Interface traffic.

DETAILED DESCRIPTION OF THE INVENTION

Figure 1:
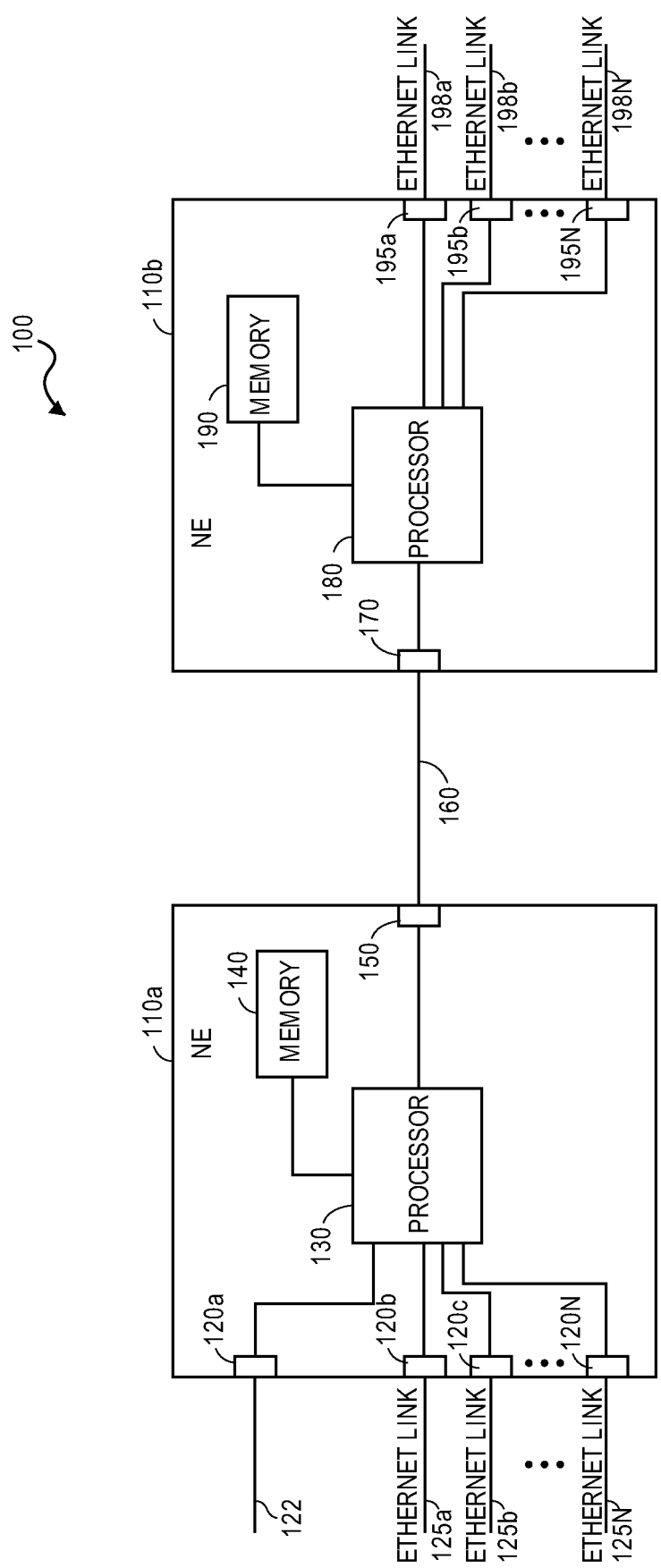
FIG. 1 illustrates a schematic block diagram of exemplary network elements within a communication network capable of communicating both Ethernet traffic and non-Ethernet traffic over the same transport medium.

FIG. 1 illustrates a schematic block diagram of exemplary network elements (NEs) 110a and 100b within a communication network 100 capable of communicating both Ethernet traffic and non-Ethernet traffic over the same transport medium 160. NE 110a includes a plurality of input ports 120a, 120b, 120c, ... 120N, a processor 130, a memory 140 and an output port 150. Input port 120a is coupled to an upstream communication link 122 to receive non-Ethernet traffic, while input ports 120b, 120c ... 120N are coupled to respective Ethernet links 125a, 125b, ... 125N to receive Ethernet traffic. Output port 150 is coupled to the transport medium 160. It should be understood that the transport medium 160 can include one or more links, such as Optical Transport Network (OTN) links.

NE 110b includes an input port 170, processor 180, memory 190 and output ports 195a, 195b, ... 195N. Input port 170 is coupled to the transport medium 160, while output ports 195a, 195b, ... 195N are coupled to respective Ethernet links 198a, 198b, ... 198N. It should be understood that each of the NEs 110a and 110b may include ports coupled to one or more Ethernet links to transmit and/or receive Ethernet traffic, and may further include one or more additional ports coupled to other communication links to transmit and/or receive non-Ethernet traffic. Each of the NEs 110a and 110b, may be, for example, a switch, router, base station equipment or other networking equipment. For example, in an exemplary embodiment, NE 110a and 110b collectively form a radio base station system that communicates Common Public Radio Interface (CPRI) traffic over the transport medium 160.

In an exemplary operation, NE 110a receives non-Ethernet traffic via input port 120a and Ethernet traffic via one or more of input ports 120b, 120c, ... 120N. The processor 130 receives the Ethernet traffic and non-Ethernet traffic and generates a plurality of multi-frames including both the Ethernet traffic and non-Ethernet traffic for transmission over the transport medium 160 via output port 150. In an exemplary embodiment, the memory 140 includes one or more algorithms executable by the processor 130 to generate and transmit the multi-frame over the transport medium 160.

Each of the multi-frames includes a plurality of group slots. Each of the group slots includes a first set of bytes allocated to carry non-Ethernet traffic and a second set of bytes allocated to carry Ethernet traffic. The number of bytes allocated to carry Ethernet traffic is programmable, depending on the expected bandwidth of the Ethernet traffic. For example, in an exemplary embodiment, the number of bytes allocated to carry Ethernet traffic in each group slot is between 1 and 33 bytes, which enables just over 1 Gbps of Ethernet traffic to be sent on the transport medium 160. However, it should be understood that the number of bytes allocated to carry Ethernet traffic may be more than 33 bytes depending on the data rate and other factors.

When multiple Ethernet links 125a, 125b ... 125N are enabled, the processor 130 services each of the links 125a, 125b ... 125N in a fixed order, and bytes from each of the links 125a, 125b ... 125N are included in each of the group slots. For example, a first number of bytes in each group slot can be allocated to the first Ethernet link 125a, a second number of bytes in each group slot can be allocated to the second Ethernet link 125b and so on. The number of bytes (e.g., between 1 and 33 bytes) and position of the bytes within each group slot allocated to each Ethernet link can be determined based on a number of factors, including but not limited to, the rank associated with each Ethernet link 125a, 125b ... 125N. For example, the Ethernet link with the highest rank can be allocated the first ten bytes in each group slot, the Ethernet link with the second highest rank can be allocated the next eight bytes in each group slot and the Ethernet link with the lowest rank can be allocated the next twelve bytes in each group slot.

The Ethernet traffic on each Ethernet link 125a, 125b ... 125N is received by the processor 130 as a plurality of Ethernet frames or packets. The Ethernet frames/packets on each Ethernet link have a respective inter-packet spacing (or timing) therebetween. To enable the original packet spacing to be reconstructed at the far end (by the NE 110b), a timestamp is included in the multi-frames for each of the Ethernet frames that indicates when the start of the Ethernet frame was received from the Ethernet link relative to the start of a main frame including one or more multi-frames. In an exemplary embodiment, at least one of the multi-frames in the main frame includes at least a portion of the Ethernet frame. In other embodiments, the timestamp may not be relative to the start of the main frame in which at least a portion of the Ethernet frame is transmitted (e.g., if the Ethernet frame arrives just before the start of a new multi-frame).

At the receiving NE 110b, the multi-frames are received by the processor 180 via input port 170. The processor 180 processes the multi-frames to extract the Ethernet traffic from the group slots and to transmit the extracted Ethernet traffic onto one or more Ethernet links 198a, 198b, ... 198N via output ports 195a, 195b, ... 195N. The processor 180 further uses the timestamp(s) in the group slots to reconstruct original spacing between the Ethernet packets of the Ethernet traffic prior to transmitting the Ethernet traffic over Ethernet links 198a, 198b, ... 198N. In an exemplary embodiment, the memory 190 includes one or more algorithms executable by the processor 180 to process the multi-frame and transmit the extracted Ethernet traffic over the Ethernet links 198a, 198b, ... 198N.

In an exemplary operation, the processor 180 receives a multi-frame via input port 170, identifies the group slots in the multi-frame and processes each of the group slots to extract the Ethernet frames and associated timestamps therefrom. The processor 180 further replicates the relative timing (spacing) of the Ethernet frames based on the timestamps prior to transmitting the extracted Ethernet traffic on links 198a, 198b, ... 198N. When the multi-frame includes Ethernet traffic from multiple Ethernet links (multiple Ethernet streams), the processor 180 further identifies each of the Ethernet streams included in the multi-frame, determines the output Ethernet link 198a, 198b, ... 198N for each of the Ethernet streams and transmits each Ethernet stream on the associated output Ethernet link 198a, 198b, ... 198N.

In addition, the processor 180 can further add latency to the transmission of the Ethernet traffic on Ethernet links 198a, 198b, ... 198N. For example, when the processor 180 receives the first Ethernet packet, the processor 180 can hold the packet for an amount of time equal to the predetermined worst-case jitter a packet could experience between receipt of the packet at NE 110a and receipt of the packet at NE 110b.

Figure 2:
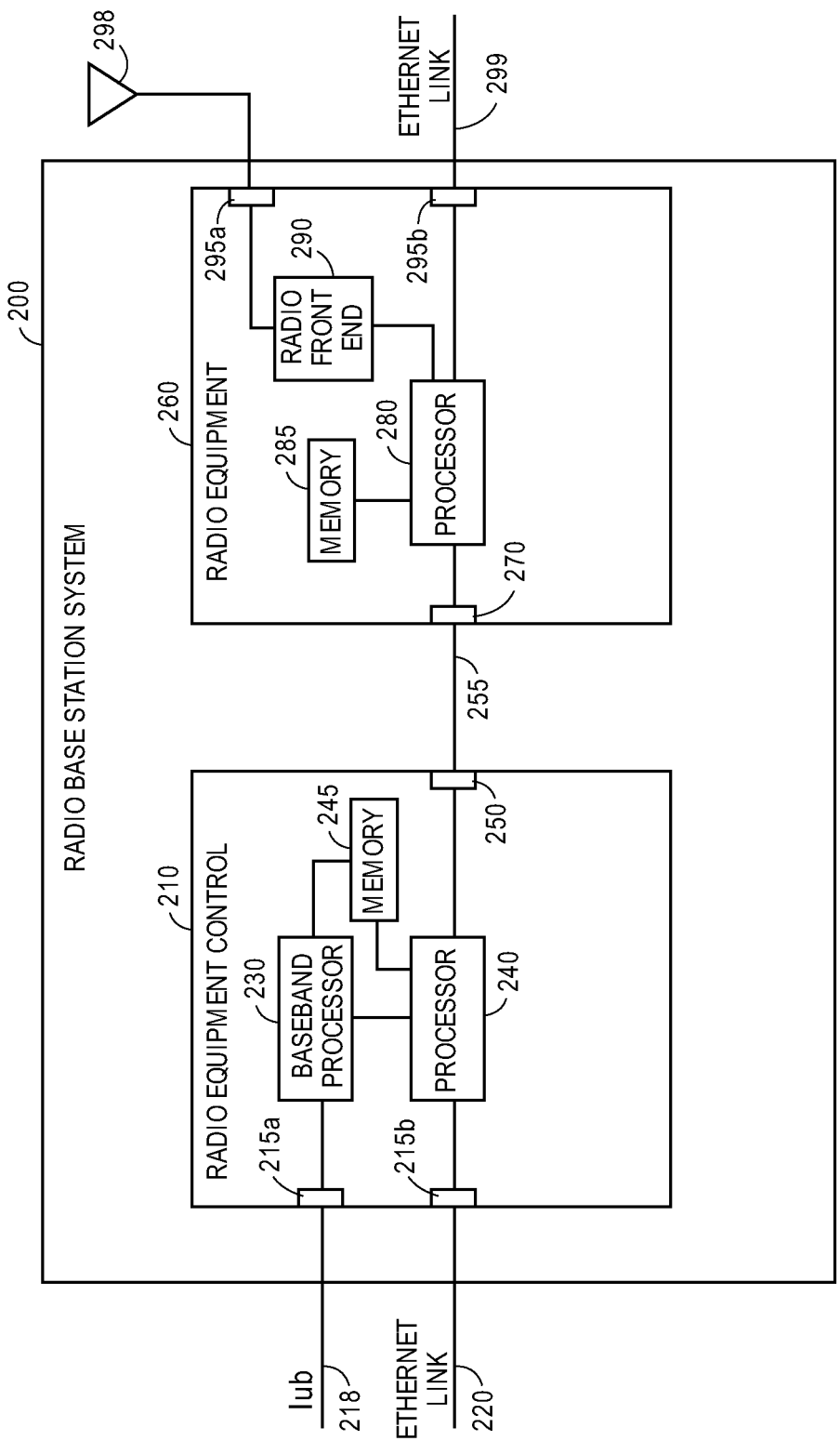
FIG. 2 illustrates a schematic block diagram of a radio base station system capable of communicating both CPRI traffic and Ethernet traffic over the same transport medium.

FIG. 2 illustrates an exemplary embodiment of a radio base station system 200 capable of communicating both CPRI traffic and Ethernet traffic over the same transport medium. The radio base station system 200 includes Radio Equipment Control (REC) 210 and Radio Equipment (RE) 260 coupled via transport medium 255. The transport medium 255 may include one or more links, each capable of transmitting both CPRI traffic and Ethernet traffic. Each link 255 may be, for example, an Optical Transport Network (OTN) link.

The REC 210 provides access to, for example, a Radio Network Controller (not shown) via upstream communication link 218. In Universal Mobile Telecommunications Systems, the communication link 218 is referred to as the Iub interface. The RE 260 serves as the air interface to the mobile user equipment (not shown). In general, the REC 210 includes the radio functions of the digital baseband domain, whereas the RE 260 includes the analog radio frequency functions. For example, when connecting a REC 210 and a RE 260 with one or several links 255, the resulting entity may be referred to as a Node B in a WCDMA (Wideband Code Division Multiple Access) Radio Access Network.

The REC 210 further includes input ports 215a and 215b, baseband processor 230, general processor 240, memory 245 and output port 250. Input port 215a is coupled to the upstream communication link 218 to receive non-Ethernet traffic (e.g., voice, text and/or multi-media data for transmission to mobile user equipment), while input port 215b is coupled to Ethernet link 220 to receive Ethernet traffic (e.g., backhaul traffic and/or GSM A-bis traffic). It should be understood that REC 210 may include additional input ports coupled to additional Ethernet links. Output port 250 is coupled to CPRI link 255.

The RE 260 further includes input port 270, processor 280, memory 285, Radio Front End 290 and output ports 295a and 295b. Input port 270 is coupled to transport medium 255 to receive multi-frames generated and transmitted by the REC 210. Output port 295a is coupled to antenna 298, while output port 295b is coupled to downstream Ethernet link 299.

In an exemplary operation, traffic received via input port 215a is processed by baseband processor 230. For example, baseband processor 230 may perform channel coding (modulation), interleaving, spreading and scrambling to produce digital baseband (IQ) data. The digital baseband data is provided to processor 240. In addition, Ethernet traffic received via input port 215b is also provided to processor 240. Processor 240 then generates one or more multi-frames, as described above, and inserts the digital baseband data and Ethernet traffic into the multi-frames. In addition to digital baseband (IQ) data, control and management information may also be included in the multi-frames. The digital baseband data and control and management information is collectively referred to herein as CPRI traffic. The processor 240 then transmits the multi-frames on transport medium 255 via output port 250.

In embodiments in which the transport medium 255 includes an OTN link, each of the multi-frames may be an OTU2 frame and the payload of the OTU2 frame is constructed to contain 47 group slots. To match rates between CPRI and OTU2, the last group slot (group slot 47) may be empty. As described above, within each group slot, a predetermined number of bytes is allocated to carry Ethernet traffic. The remaining bytes are allocated to carry CPRI traffic. In one embodiment, the CPRI traffic within each group slot has a sequence number associated therewith that can be periodically sent out-of-band with respect to the group slots in the OTU2 frame to allow for synchronization between the REC 210 and RE 260. Multiple OTU2 frames (e.g., 256 OTU2 frames) may be included within a main OTU2 frame (e.g., an OTU2 multi-frame) and the main OTU2 frame can be sent over the transport medium 255.

In an exemplary embodiment, the memory 245 includes one or more algorithms executable by the baseband processor 230 to produce the digital baseband data and one or more algorithms executable by processor 240 to generate and transmit the multi-frames over the transport medium 255. In another exemplary embodiment, the baseband processor 230 and general processor 240 are separate processing devices. However, it should be understood that in other embodiments, a single processing device may perform the operations of both the baseband processor 230 and general processor 240.

At the RE 260, the multi-frames are received via input port 270 and provided to processor 280. The processor 280 processes the multi-frames to extract the Ethernet traffic from the group slots and to transmit the extracted Ethernet traffic onto Ethernet link 299 via output port 295b. The processor 280 further processes the multi-frame to extract the CPRI traffic (including digital baseband data) and provide the digital baseband data to the Radio Front End 290. The Radio Front End 290 converts the digital baseband data from digital to analog, up-converts the analog baseband data to produce one or more Radio Frequency (RF) signals and amplifies the RF signal(s) prior to transmitting the RF signal(s) over the air interface via antenna 298. The Radio Front End 290 may further perform other radio functions, including, but not limited to, filtering and multiplexing of the RF signal. In an exemplary embodiment, the memory 285 includes one or more algorithms executable by the processor 280 to process the multi-frame, extract and transmit the digital baseband data to the Radio Front End 290 and extract and transmit the Ethernet traffic over the Ethernet link 299.

In other embodiments, the processor 280 receives Ethernet traffic via port 295*b* and generates a plurality of multi-frames including the Ethernet traffic and baseband digital data (CPRI traffic) received from the Radio Front End 290 (corresponding to one or more inbound RF signals received via antenna 298). The processor 280 further transmits the multi-frames to the REC 210 via the transport medium 255. The REC 210 receives the multi-frames via port 250 and provides the multi-frames to the processor 240. The processor 240 extracts the CPRI traffic and Ethernet traffic from the multi-frames, transmits the Ethernet traffic back out on Ethernet link 220 via port 215*b* and provides the CPRI traffic to baseband processor 230 for further processing and transmission via Iub interface 218.

It should be understood that the radio base station system 200 shown in FIG. 2 is representative of a simplified system architecture. In other embodiments, the radio base station system 200 may include multiple RECs 210 and REs 260, with multiple RECs 210 being coupled to multiple REs 260 via respective transport media over a communication network. In addition, the links between the baseband processor 230 and processor 240, as well as the links between processor 280 and radio front end 290, may include one or more CPRI links.

Figure 3:
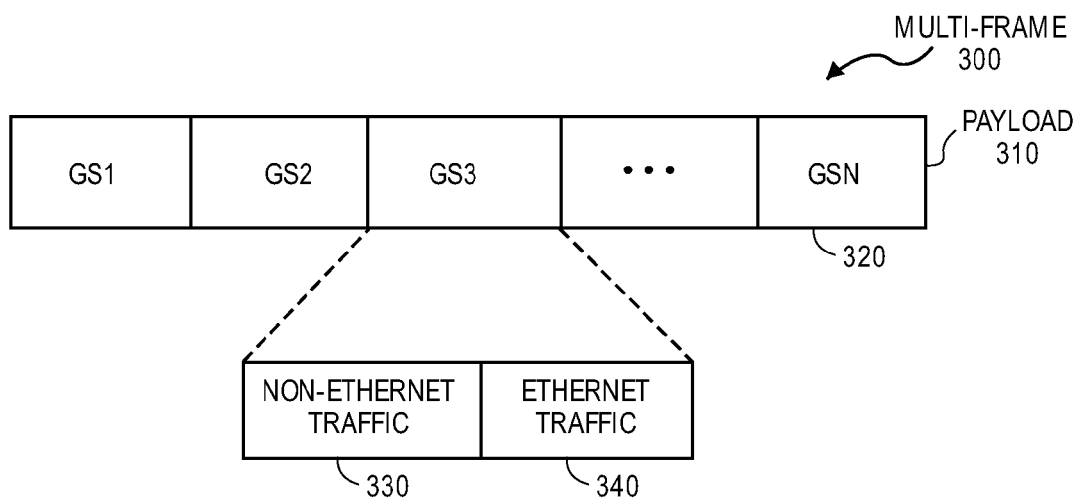
FIG. 3 illustrates an exemplary format of a multi-frame for carrying both Ethernet and non-Ethernet traffic.

FIG. 3 illustrates an exemplary format of a multi-frame 300 for carrying both Ethernet and non-Ethernet traffic. The multi-frame 300 includes a header (not shown) and a payload 310. The payload 310 includes a plurality of group slots 320 (GS1, GS2, GS3 . . . GSN). Each group slot 320 includes a plurality of bytes, where a first number of bytes are allocated to carry non-Ethernet traffic 330 and a second number of bytes are allocated to carry Ethernet traffic 340. In an exemplary embodiment, between 1 and 33 bytes are allocated to carry Ethernet traffic 340 in each group slot 320. Thirty-three bytes corresponds to a bandwidth of over 1 Gbps, which is sufficient to transport Ethernet traffic from even a heavily-loaded 1 Gbps Ethernet link. However, it should be understood that the number of bytes allocated to carry Ethernet traffic may be more than 33 bytes depending on the data rate and other factors.

The non-Ethernet traffic 330 is allocated all the bytes in each group slot 320 that are not allocated to Ethernet traffic 340. Therefore, in one embodiment, there may be several bytes of padding between the last byte of the non-Ethernet traffic 330 and the first byte of the Ethernet traffic 340 in one or more of the group slots 320. In an exemplary embodiment, the Ethernet traffic 340 appears at the end of each group slot 320 and the non-Ethernet traffic appears at the beginning of each group slot 320. However, in other embodiments, the Ethernet traffic 340 may appear before the non-Ethernet traffic 330 in each group slot 320. In still other embodiments, the order of Ethernet traffic 340 and non-Ethernet traffic 330 may vary between group slots 320 in the same multi-frame 300 and/or between multi-frames 300 or the bytes allocated to Ethernet traffic 340 and non-Ethernet traffic 330 may be non-consecutive (e.g., alternating between Ethernet traffic 340 and non-Ethernet traffic 330 or in any other arrangement of the traffic).

Figure 4:
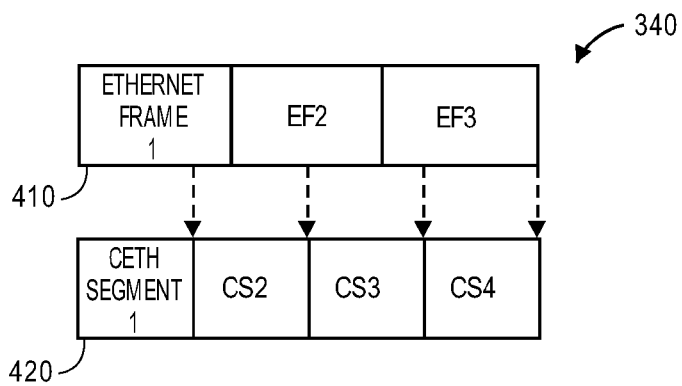
FIG. 4 illustrates an exemplary mapping of Ethernet frames to compressed Ethernet segments.

To enable the Ethernet traffic 340 to be tightly packed into the group slots 320, the Ethernet traffic 340 is segmented into compressed Ethernet (CETH) segments. FIG. 4 illustrates an exemplary mapping of Ethernet frames 410 to compressed Ethernet segments 420. The Ethernet frames 410 (three of which are shown for convenience) collectively form an Ethernet stream associated with a particular Ethernet link. The bytes forming the Ethernet stream (the stream of frames EF1, EF2 and EF3) are segmented into compressed Ethernet segments, such that the number of bytes in each compressed Ethernet segment 420 is less than the number of bytes that could be in each Ethernet frame 410. As such, each of the compressed Ethernet segments 420 may include bytes from one or more of the Ethernet frames 410.

As can be seen in FIG. 4, each Ethernet frame 410 (EF1, EF2 and EF3) includes more bytes than each compressed Ethernet segment 420 (CS1, CS2, CS3 and CS4). For example, in an exemplary embodiment, each Ethernet frame 410 includes at least 64 bytes (which is the minimum Ethernet sized frame), whereas each compressed Ethernet segment 420 includes only 48 bytes. Thus, when mapping Ethernet frames 410 containing 64 bytes to compressed Ethernet segments 420 containing 48 bytes, the first 48 bytes of EF1 map to CS1, the remaining 16 bytes of EF1 and the first 32 bytes of EF2 map to CS2, the remaining 32 bytes of EF2 and the first 16 bytes of EF3 map to CS3 and the remaining 48 bytes of EF3 map to CS4.

It should be understood that the CETH segments 420 may further include headers and additional information, such that the number of bytes of Ethernet frame data in each CETH segment may be less than 48 bytes and may further vary between CETH segments. In addition, it should be noted that once an Ethernet frame starts, it is sent continuously in consecutive compressed Ethernet segments until the Ethernet frame ends. There are no empty compressed Ethernet segments or partially empty compressed Ethernet segments in the middle of an Ethernet frame.

Figure 5:
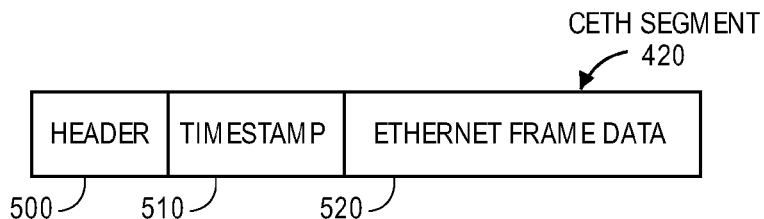
FIG. 5 illustrates an exemplary format of a compressed Ethernet segment.

FIG. 5 illustrates an exemplary format of a compressed Ethernet (CETH) segment 420. The CETH segment 420 includes a header 500, a timestamp 510 and Ethernet frame data 520. The timestamp 510 is associated with a particular Ethernet frame and precedes the start of the Ethernet frame data 520 for that Ethernet frame. In an exemplary embodiment, the timestamp 510 is a 3-byte timestamp that indicates when the start of the Ethernet frame was received from the upstream Ethernet link relative to the start of a main frame (e.g., an OTU2 multi-frame). In an exemplary embodiment, at least one of the multi-frames in the main frame includes at least a portion of the Ethernet frame. In other embodiments, the timestamp 510 may not be relative to the start of the main frame in which at least a portion of the Ethernet frame is transmitted (e.g., if the Ethernet frame arrives just before the start of a new multi-frame).

The timestamp 510 allows the far-end device (downstream network element, such as the Radio Equipment in a Radio Base Station System) to replicate the relative timing of the Ethernet frames when they are transmitted back out on the far-end downstream Ethernet link. For example, the far-end device can note the difference between the timestamp 510 for a first Ethernet frame and the time the first Ethernet frame is transmitted on the far-end downstream Ethernet link and then ensure that this difference remains constant for all subsequent Ethernet frames.

Figure 6:
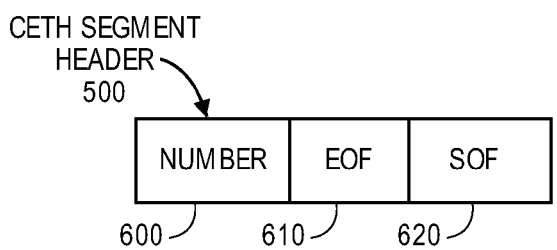
FIG. 6 illustrates an exemplary format of a header of a compressed Ethernet segment.

FIG. 6 illustrates an exemplary format of a header 500 of a compressed Ethernet segment. The header 500 includes a number field 600 that indicates the number of bytes of a first Ethernet frame in the CETH segment, an End of Frame (EOF) field 610 that indicates whether the first Ethernet frame ends in the CETH segment and a Start of Frame (SOF) field 620 that indicates whether a second (consecutive subsequent) Ethernet frame starts in the CETH segment. The SOF for the first Ethernet frame is inferred if the length is non-zero, and the previous CETH segment was empty or contained an EOF, but no SOF. Any second Ethernet frame is assumed to fill the remainder of the CETH segment. This assumption is possible since the minimum-sized Ethernet frame (e.g., 64 bytes) is larger than the size of the CETH segment (e.g., 48 bytes).

In an exemplary embodiment, the number field 600 includes six bits, the EOF field includes one bit and the SOF field includes one bit. If there is only one Ethernet frame in the CETH segment, the SOF bit (which indicates the start of a second Ethernet frame) is set to zero. If the end of the first Ethernet frame does not appear in the CETH segment, the EOF bit is set to zero.

FIGS. 7A-7E illustrate exemplary Ethernet frames being transported via compressed Ethernet segments. In FIGS. 7A-7E, three consecutive Ethernet frames 730a-730c are mapped to CETH segments 700a-700e. Each Ethernet frame 730a-730c includes 67-bytes and each CETH segment 700a-700e includes 48 bytes. The first Ethernet frame 730a starts in the first CETH segment 700a, shown in FIG. 7A. The first CETH segment 700a further includes a one-byte header 710a and a three-byte timestamp 720a. Since there is only one Ethernet frame 730a in the first CETH segment 700a, the SOF bit in the header 710a is zero. In addition, the EOF bit in the header 710a is also zero because the end of the first Ethernet frame 730a does not appear in the first CETH segment 700a. After the one-byte header 710a and the three-byte timestamp 720a, the remaining 44 bytes in the first CETH segment 700a are filled with the first 44 bytes of the first Ethernet frame 730a. Thus, the number field in the header 710a indicates there are 44 bytes of the first Ethernet frame 730a in the CETH segment 700a.

Figure 7A:
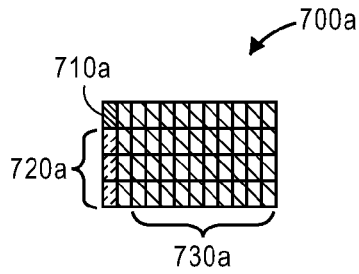
FIGS. 7A-7E illustrate exemplary Ethernet frames being transported via compressed Ethernet segments.
Figure 7B:
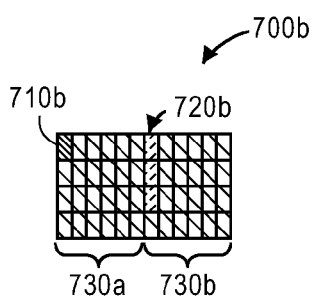

The remaining 23 bytes of the first Ethernet frame 730a are included in the next CETH segment 700b, shown in FIG. 7B. The second CETH segment 700b also includes a header 710b, which has the number field set to 23 bytes to indicate that there are 23 bytes of the first Ethernet frame 730a in the CETH segment 700b. In addition, the EOF bit set to one since the first Ethernet frame 730a ends in the second CETH segment 700b, and the SOF bit in the header 710b is also set to one to indicate the start of the second Ethernet frame 730b in the second CETH segment 700b. Between the end of the first Ethernet frame 730a and the start of the second Ethernet frame 730b, a second three-byte timestamp 720b associated with the second Ethernet frame 730b is included. After the second timestamp 720b, the first 21 bytes of the second Ethernet frame 730b are included in the second CETH segment 700b.

Figure 7D:
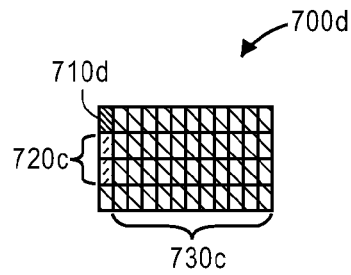
Figure 7C:
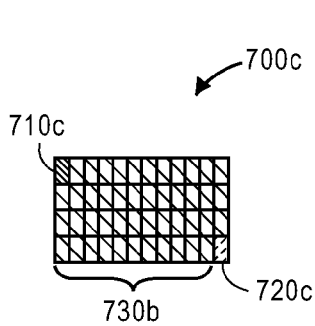

As shown in FIG. 7C, the remaining 46 bytes of the second Ethernet frame 730b appear in the third CETH segment 700c. In the header 710c of the third CETH segment 700c, the number field is set to 46 bytes to indicate there are 46 bytes of the second Ethernet frame 730b in the CETH segment 700c. In addition, the EOF bit is set to one since the second Ethernet frame 730b ends in the third CETH segment 700c, and the SOF bit is also set to one since the third Ethernet frame 730c starts in the third CETH segment 700c. However, there is only room for the first byte of the three-byte timestamp 720c for the third Ethernet frame 730c in the third CETH segment 700c.

In the fourth CETH segment 700d, as shown in FIG. 7D, the remaining two bytes of the third timestamp 720c follow the fourth header 710d. CETH segment 700d can carry only 45 bytes of the third Ethernet frame 730c, and therefore, the number field in the header 710d is set to 45 bytes. Since the third Ethernet frame 730c neither starts nor ends within the fourth CETH segment 700d, both the SOF and EOF bit are set to zero in the header 700d.

Figure 7E:
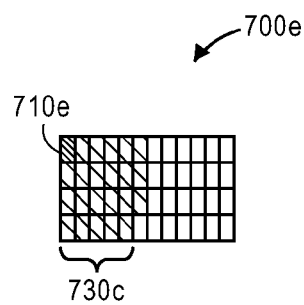

Finally, as shown in FIG. 7E, the remaining 22 bytes of the third Ethernet frame 730c are included in the fifth CETH segment 700d. In the header 710e of the fifth CETH segment 700e, the number field is set to 22 bytes to indicate there are 22 bytes of the third Ethernet frame 730c in the CETH segment 700d. In addition, the EOF bit is set to one to indicate the end of the third Ethernet frame 730c. However, the SOF bit is set to zero because there are no more frames in the CETH segment 700e.

Each of the CETH segments 700a-700e are inserted into the group slots of multi-frames based on the number of bytes allocated to Ethernet traffic in the group slots. For example, if 33 bytes are allocated to Ethernet traffic in each group slot, the first group slot would contain the first 33 bytes of CETH segment 700a, the second group slot would contain the remaining 15 bytes of CETH segment 700a and the first 18 bytes of CETH segment 700b, and so on.

Figure 8:
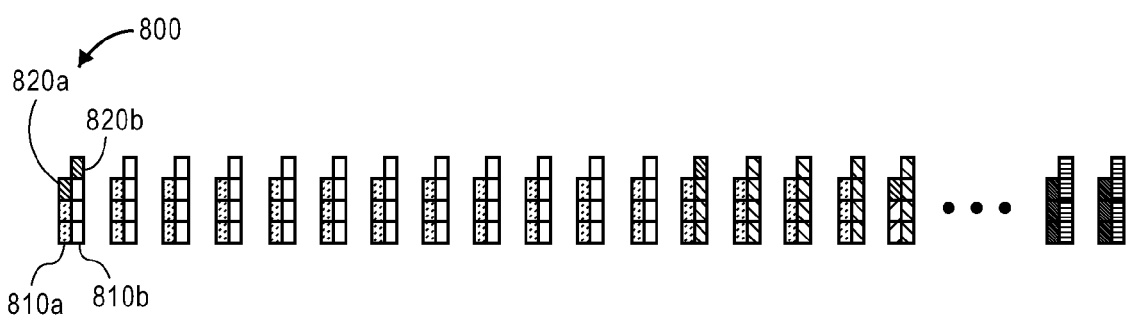
FIG. 8 illustrates an exemplary format of the Ethernet portion of a plurality of group slots for transmitting Ethernet traffic from multiple Ethernet links.

When multiple upstream Ethernet links are enabled, the CETH segments for each Ethernet link are inserted into the group slots of a multi-frame based on the number of bytes in each group slot that is allocated to each Ethernet link. In addition, in an exemplary embodiment, the bytes from each of the Ethernet links are inserted into the group slots in a fixed (predetermined) order. FIG. 8 illustrates an exemplary format of the Ethernet portion of a plurality of group slots 800 for transmitting Ethernet traffic from multiple Ethernet links.

In FIG. 8, two such Ethernet links are being serviced. The first Ethernet link is allocated three bytes 810a in each group slot 800, while the second Ethernet link is allocated four bytes 810b. In particular, the first Ethernet link is allocated the first three bytes 810a following the non-Ethernet traffic (e.g., CPRI traffic) and the second Ethernet link is assigned the next four bytes 810b (i.e., the last four bytes) in each group slot 800.

As discussed above, at the beginning of each CETH segment of each Ethernet link, a respective header 820a and 820b is included. In embodiments in which each CETH segment is 48 bytes long, the first header 820a for the first Ethernet link appears in the first group slot 800, while the second header for the first Ethernet link appears in the seventeenth group slot. For the second Ethernet link, the first header 820b appears in the first group slot 800, while the second header appears in the thirteenth group slot. Timestamps for each Ethernet frame in each Ethernet link may also be included, as discussed above.

Figure 9:
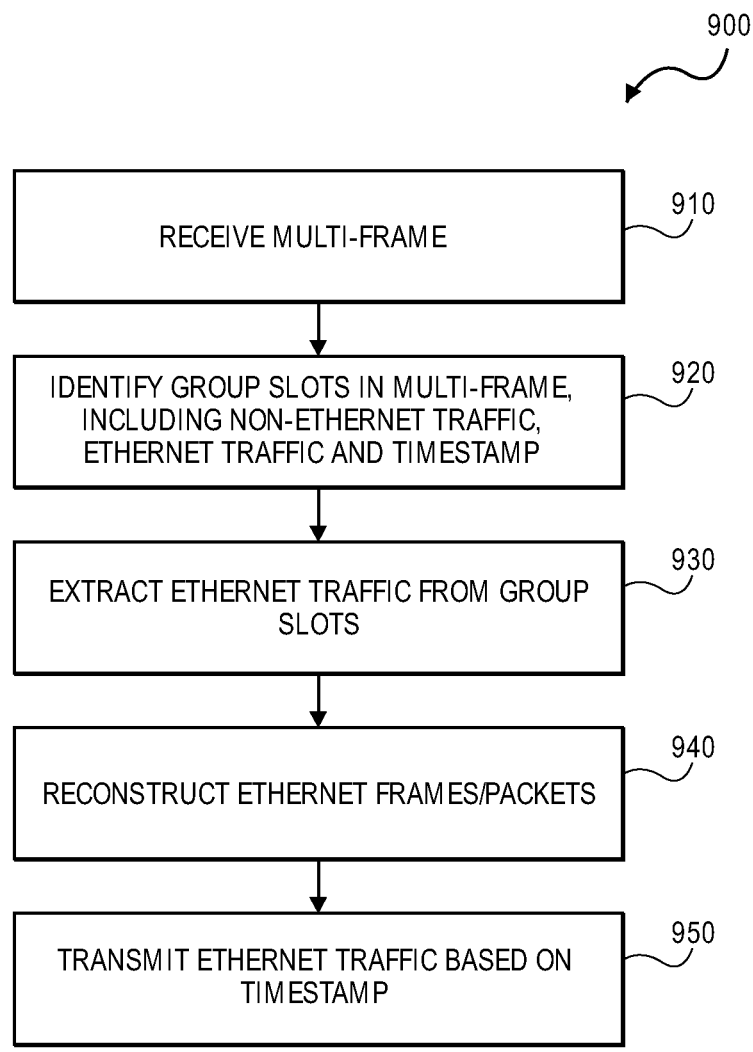
FIG. 9 illustrates an exemplary flow diagram of a method for transporting Ethernet and non-Ethernet traffic over the same transport medium in a network.

FIG. 9 illustrates an exemplary flow diagram of a method 900 for transporting Ethernet and non-Ethernet traffic over a transport medium in a network. The method begins at 910, where a multi-frame including a plurality of group slots, each containing bytes allocated to carry non-Ethernet traffic and bytes allocated to carry Ethernet traffic, is received at a network element within the network. For example, in an exemplary embodiment, the multi-frame is received at the REC or RE of a radio base station system.

At 920, the group slots in each multi-frame are identified, including the non-Ethernet traffic and the Ethernet traffic. The Ethernet traffic is segmented into CETH segments within the group slots and respective timestamps associated with each Ethernet frame in the Ethernet traffic is further included within the CETH segments. At 930, the Ethernet traffic (and associate timestamps) are extracted from the group slots, and at 940, the Ethernet frames/packets are reconstructed from the CETH segment data. At 950, the Ethernet traffic is transmitted back out onto one or more Ethernet links at a time determined from the timestamp.

Figure 10:
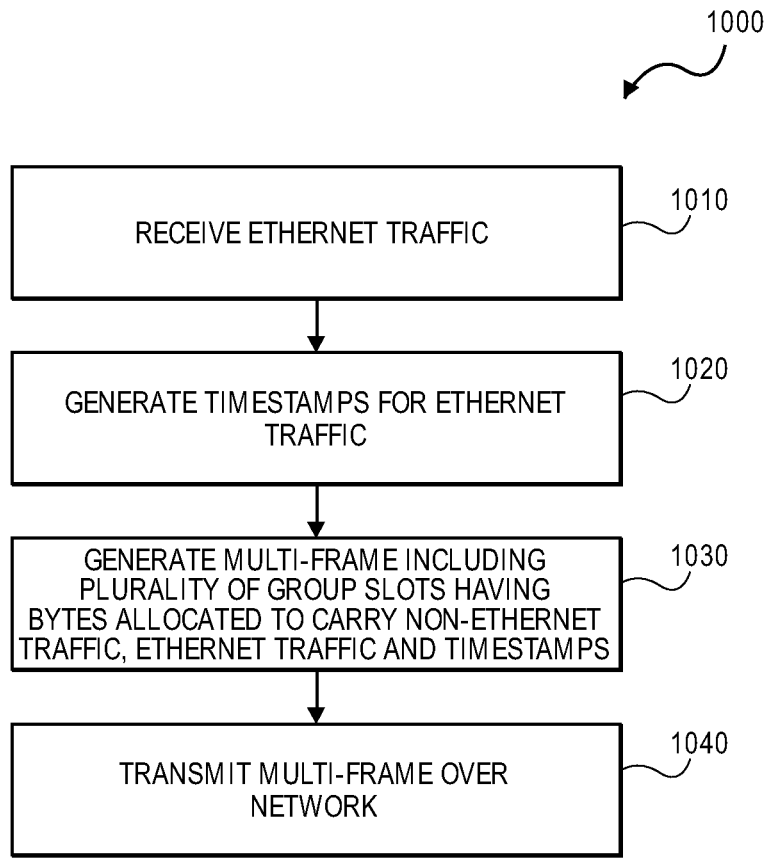
FIG. 10 illustrates another exemplary flow diagram of a method for transporting Ethernet and non-Ethernet traffic over the same transport medium in a network.

FIG. 10 illustrates another exemplary flow diagram of a method 1000 for transporting Ethernet and non-Ethernet traffic over a transport medium in a network. The method begins at 1010, where Ethernet traffic is receive at a network element within the network. For example, in an exemplary embodiment, the Ethernet traffic is received at the REC or RE of a radio base station system. At 1020, the network element generates a timestamp for each Ethernet frame of the Ethernet traffic. In an exemplary embodiment, the timestamp is generated when the first octet of an Ethernet frame is received.

At 1030, the network element generates one or more multi-frames, each including a plurality of group slots. Each of the group slots includes bytes allocated to carry non-Ethernet traffic and bytes allocated to carry Ethernet traffic. In an exemplary embodiment, the Ethernet traffic is segmented into CETH segments and the respective timestamp for each Ethernet frame is included in the CETH segments at the beginning of the associated Ethernet frame. The CETH segments (including the timestamps and Ethernet frames) are included in the group slots of the multi-frames within the bytes allocated to Ethernet traffic therein. At 1040, the multi-frame(s) are transmitted over the network. In an exemplary embodiment, the multi-frame(s) are transmitted over one or more CPRI links between the REC and RE of a radio base station system.

As used herein, the term "processor" is generally understood to include one or more processing devices used in network equipment, such as microcontrollers, Field Programmable Gate Arrays (FPGAs), multi-core processors or a combination thereof. In addition, as used herein, the term "memory" may include one or more of a data storage device, random access memory (RAM), read only memory (ROM), flash memory, database or other type of storage device or storage medium.

As may also be used herein, the terms "operable to" or "configured to" indicates that an item includes one or more of processing modules, data, input(s), output(s), etc., to perform one or more of the described corresponding functions and may further include inferred coupling to one or more other items to perform the described or necessary corresponding functions. In addition, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to". As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may still further be used herein, inferred coupling (i.e., where one element is coupled to another element by inference) includes direct and indirect coupling between two items in the same manner as "coupled to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A network element within a network, comprising:
   an input port configured to couple to a transport medium in the network to receive a multi-frame including Ethernet traffic and non-Ethernet traffic;
   a processor configured to:
      process the multi-frame to identify a plurality of group slots, each of the plurality of group slots including a first set of bytes allocated to carry the non-Ethernet traffic and a second set of bytes allocated to carry the Ethernet traffic, a group slot of the plurality of group slots including a timestamp;
      extract the Ethernet traffic from the plurality of group slots, wherein the Ethernet traffic includes a plurality of Ethernet frames that are compressed Ethernet segments and each of the group slots includes at least part of a compressed Ethernet segment, wherein each of the plurality of Ethernet frames are extracted from consecutive compressed Ethernet segments within the multi-frame and each of the compressed Ethernet segments includes the Ethernet traffic associated with a single Ethernet link; and
   an output port configured to transmit the Ethernet traffic over an additional transport medium in the network;
   wherein the processor uses the timestamp to reconstruct original spacing between packets of the Ethernet traffic prior to transmitting the Ethernet traffic over the additional transport medium.

2. The network element of claim 1, wherein the second set of bytes in each of the plurality of group slots includes a same predetermined number of bytes.

3. The network element of claim 1, wherein a last group slot in the plurality of group slots is empty.

4. The network element of claim 1, wherein the first set of bytes includes the non-Ethernet traffic and padding prior to the start of the Ethernet traffic in the second set of bytes.

5. The network element of claim 1, wherein the Ethernet traffic is received from two or more Ethernet links and the second set of bytes includes the Ethernet traffic from each of the two or more Ethernet links.

6. The network element of claim 5, wherein each of the two or more Ethernet links is allocated a specific number of bytes in the second set of bytes of each of the plurality of group slots.

7. The network element of claim 1, wherein each of the compressed Ethernet segments includes a predetermined number of bytes spread out over two or more of the group slots.

8. The network element of claim 1, wherein a first byte in each of the compressed Ethernet segments includes a header.

9. The network element of claim 8, wherein the header includes a length field indicating a number of bytes of a first Ethernet frame within the compressed Ethernet segment, an end of frame bit indicating an end of frame for the first Ethernet frame and a start of frame bit indicating a start of frame for a second Ethernet frame within the compressed Ethernet segment.

10. The network element of claim 9, wherein:
the end of frame bit is set to one when the Ethernet frame ends within the compressed Ethernet segment; and
the start of frame bit is set to one when the second Ethernet frame starts within the compressed Ethernet segment.

11. The network element of claim 1, wherein the part of the compressed Ethernet segment included within each of the group slots is equivalent to a number of bytes allocated to the Ethernet link associated with the compressed Ethernet segment for each of the group slots.

12. The network element of claim 1, wherein:
the timestamp indicates when an Ethernet frame was received by a sending network node relative to when a main frame including a plurality of multi-frames was transmitted by the sending network node to the network element.

13. The network element of claim 1, wherein the non-Ethernet traffic includes Common Public Radio Interface traffic.

14. A network element within a network, comprising:
an input port configured to couple to a transport medium in the network to receive Ethernet traffic;
a processor configured to:
generate a multi-frame including the Ethernet traffic and non-Ethernet traffic, the multi-frame including a plurality of group slots, each of the plurality of group slots including a first set of bytes allocated to carry the non-Ethernet traffic and a second set of bytes allocated to carry the Ethernet traffic, wherein the Ethernet traffic includes a plurality of Ethernet frames in a plurality of compressed Ethernet segments within the multi-frame and wherein each of the compressed Ethernet segments includes the Ethernet traffic associated with a single Ethernet link, wherein each of the plurality of Ethernet frames is inserted in consecutive compressed Ethernet segments within the multi-frame and each of the group slots includes at least part of a compressed Ethernet segment;
generate a timestamp and include the timestamp in a group slot of the plurality of group slots; and
an output port configured to transmit the multi-frame over an additional transport medium to an additional network element in the network; and
wherein the processor generates the timestamp to enable the additional network element to reconstruct original spacing between packets of the Ethernet traffic.

15. The network element of claim 14, wherein:
the timestamp indicates when an Ethernet frame was received by the network element relative to when a main frame including a plurality of multi-frames was transmitted by the network element.

16. A method for transporting traffic over a network, comprising:
receiving a multi-frame including Ethernet traffic and non-Ethernet traffic at a network element;
processing, by a processor within the network element, the multi-frame to identify a plurality of group slots, each of the plurality of group slots including a first set of bytes allocated to carry the non-Ethernet traffic and a second set of bytes allocated to carry the Ethernet traffic, a group slot of the plurality of group slots including a timestamp;
extracting the Ethernet traffic from the plurality of group slots, wherein each of the group slots includes at least part of a compressed Ethernet segment and wherein the at least part of the compressed Ethernet segment included within each of the group slots is equivalent to a number of bytes allocated to an Ethernet link associated with the compressed Ethernet segment, wherein the Ethernet traffic includes a plurality of Ethernet frames; and each of the plurality of Ethernet frames is extracted in consecutive compressed Ethernet segments within the multi-frame;
using, by the processor, the timestamp to reconstruct original spacing between packets of the Ethernet traffic; and
transmitting the Ethernet traffic by the network element over the network based on the original spacing.

\* \* \* \* \*